United States Patent [19]

Barnes et al.

[11] 4,241,312
[45] Dec. 23, 1980

[54] SELF-CALIBRATING THRESHOLD DETECTOR

[76] Inventors: Robert A. Frosch, Administrator of the National Aeronautics and Space Administration, with respect to an invention of James R. Barnes, Dominguez Hills; Marshall Y. Huang, Rancho Palos Verdes, both of Calif.

[21] Appl. No.: 61,556

[22] Filed: Jul. 27, 1979

[51] Int. Cl.³ .................... H03K 13/01; H04B 1/12
[52] U.S. Cl. ................................. 329/50; 329/107; 375/1; 375/34; 375/99; 375/104
[58] Field of Search ............... 329/50, 104, 107, 110, 329/111, 136; 375/115, 116, 118, 119, 82, 34, 1, 96, 99, 102, 104; 455/303, 305, 306; 370/107

[56] References Cited

U.S. PATENT DOCUMENTS

| | | | |
|---|---|---|---|
| 3,478,268 | 11/1969 | Coviello | 455/306 X |
| 3,944,938 | 3/1976 | Brouant | 329/136 X |
| 4,039,749 | 8/1977 | Gordy et al. | 375/115 |
| 4,203,071 | 5/1980 | Bowles et al. | 375/115 X |

*Primary Examiner*—Siegfried H. Grimm
*Attorney, Agent, or Firm*—Marvin F. Matthews; John R. Manning

[57] ABSTRACT

A self-calibrating threshold detector for use with receivers adapted to receive an incoming transmitted signal carrying a prescribed code. The detector comprises a single demodulating channel which includes a mixer having one input receiving the incoming signal and another input receiving a local replica code. During a short time interval, an incorrect local code is applied to the mixer to incorrectly demodulate said incoming signal and to provide a reference level that calibrates the noise propagating through the channel. A sample-and-hold circuit is coupled to the channel for storing a sample of the reference level. During a relatively long time interval, the correct replica code provides an output level which ranges between the reference level and a maximum level that represents incoming signal presence and synchronism with the replica code. A summer subtracts the stored sample reference from said output level to provide a resultant difference signal indicative of the acquisition of the expected signal.

6 Claims, 3 Drawing Figures

SELF-CALIBRATING THRESHOLD DETECTOR

ORIGIN OF THE INVENTION

The invention described herein was made in the performance of work under a NASA contract and is subject to the provisions of Sections 305 of the National Aeronautics and Space Act of 1958, Public Law 85-568 (72 Stat. 435; 45 U.S.C. 2457).

BACKGROUND OF THE INVENTION (a) Field of the Invention

This invention relates generally to signal detecting systems and more particularly to receivers employing an auxiliary detector for detecting the arrival of an expected transmitted signal by correlating the phase of a local phase-coded signal, produced by a local replica generator, with the phase of the transmitted signal.

(b) Description of the Prior Art

In spacecraft receivers as well as in many other signal receiving environments, the signal-to-noise (S/N) ratio is unusually low. Accordingly, special care must be taken to design accurate and reliable signal receivers for use in such environments. Most spacecraft receivers must remain operative for long periods of time without requiring adjustments or repair. For example, when such a receiver is used in a Jupiter probe, it will not be returned to earth for service and must function for a long time under extremely severe signal transmission conditions.

On the other hand, in the shuttle communication and tracking equipment (SCTE), the receiver will come back with the shuttle. It is used for communicating with the earth and with other spacecrafts. Usually the power of the transmitted signal which arrives to the receiver is very low: large distances between the earth transmitter and the spacecraft receiver exist; large levels noise distort the transmitted signal, for example, when the spacescraft's antenna is pointing toward the sun. Thus, in such systems, the S/N ratio may become extremely low, say on the order of −22.5 db.

Auxiliary networks have been proposed for improving the reception of low-power signals by conventional receivers in an environment producing a low S/N ratio. Typically, known receivers include a local replica code signal generator that produces a signal that is phase modulated with a prescribed replica code identical to the code used on ground for modulating the transmitted signal. The transmitted signal typically carries a pseudo-random-noise (PN) serial code. It was found that the PN code provides the best signal characteristics for this type of signal reception.

It is an object of one such known auxiliary network to act as a detector to detect the arrival of the expected code by adjusting the phase of the local replica code until it becomes in full alignment with the phase of the incoming code, and then to maintain synchronism of the local generator with the code on the received signal. To achieve this object, the known detector comprises a "reference" channel in parallel with a "signal" channel. The circuits in the two channels are fully matched for their electrical characteristics. The incoming PN code is applied simultaneously to the reference and signal channels.

The reference channel demodulates or correlates the incoming PN code with a local, completely incorrect, demodulating signal which has a code pattern totally distinct from the pattern of the incoming PN code carried by the transmitted signal.

The signal channel, on the other hand, demodulates the incoming PN code with the local, replica PN code. When the phase of the replica PN code is adjusted to become aligned with the phase of the incoming PN code, a substantial increase in the output level of the signal channel occurs, as compared to its output level produced when the replica and incoming codes are in phase error, or when the incoming signal has an incorrect code.

The output levels from the two parallel channels are subtracted in a summer to provide a difference signal which, if it exceeds a threshold level, is applied to the logic section of the receiver, commanding it to stop the search of the incoming PN code by the detector and to start tracking and detecting the incoming signal. The detector, therefore, serves as a threshold detector for the receiver.

Each channel of such a detector includes a mixer, a band-pass filter (BPF), a radio-frequency (RF) amplifier, an amplitude detector, and a low-pass filter (LPF) amplifier.

If the signal and reference channels had their circuits perfectly matched and if their electric characteristics did not change with time, use, and temperature, such detector would operate satisfactorily. However, the channels' electric characteristics do change with time, use, temperature, and with other environmental conditions. Therefore, the reference and signal channels develop with time different phase and gain characteristics. As a result, relatively expensive components and circuits have to be used to minimize such changes. Also, temperature-compensating networks have to be employed at least for the amplifiers in both the signal and reference channels. But even the temperature-compensating networks themselves change their electric characteristics with aging. Additionally, the filters, such as band-pass filters, require precise components so as to obtain a frequency response that remains substantially constant over the useful life of the receiver.

The need for the reference channel in the known threshold detector stems from the need to allow weak incoming signals to be detected without appreciably distorting strong signal reception. Using two channels it is possible to detect the same noise in both channels and to thereby produce noise cancellation by substraction. When the output of the reference channel is subtracted from the output of the signal channel, there is obtained a difference whose sign gives a clear indication of the presence or "acquisition" of the incoming PN code, and whose amplitude corresponds to the degree of correlation between the incoming PN code with the local PN code. Thus, the reference channel is used in accordance with the prior art teachings for calibrating the signal channel. But the effectiveness of such calibration changes with aging.

Another major drawback of the two-channel threshold detector is that it requires duplication of relatively expensive and large circuits and components used for each channel and for the temperature-compensating networks.

Accordingly, it is a general object of this invention to provide a new and improved threshold detector which requires a minimum of circuits thereby affording economy in cost and packaging.

The general object of the invention is accomplished by providing a single channel and by time-sharing the single channel with the aid of relatively inexpensive, small and generally available digital components.

SUMMARY OF THE INVENTION

The single-channel threshold detector is time-shared so that during a short time interval, the channel is arranged to correlate the incoming code with an incorrect local code and to produce an output amplitude level which is sampled, filtered and stored. Then during a longer time interval, the single-channel is arranged to correlate the incoming code with a local replica code and to produce an output level. Subtraction in a summer of the stored sample level from the channel's output level provides the desired difference signal as in the known two-channel detector.

Thus, by using time-sharing of a single-channel, threshold detection can be achieved without undue concern for component aging, ambient temperature variations, and other constraints that limit the use of the known two-channel detector. Furthermore, fewer circuits are required, especially those which are relatively expensive and relatively large and, therefore, less power is consumed and less packaging space is required.

DESCRIPTION OF PREFERRED EMBODIMENTS OF THE INVENTION

Figure 1:
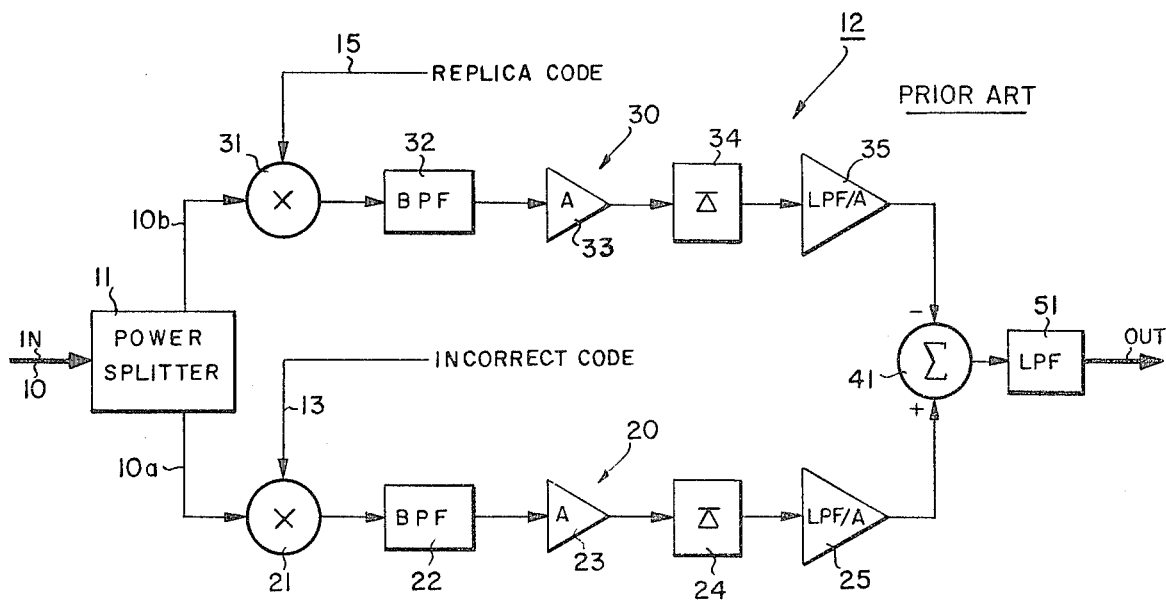
FIG. 1 is a block diagram of the prior art two-channel threshold detector.

A. Detailed Description of the Prior Art

The invention will be better understood from a detailed description of the prior art.

In the known, two-channel threshold detector 12 (FIG. 1), an incoming phase-modulated wave is expected to arrive on line 10 from a transmitter (not shown). To facilitate the description of the invention, it will be assumed that a reference numeral adjacent to a conductor or line will also denote the signal existing on that line. Thus, for example, reference numeral 10 will denote the input as well as the incoming signal on this line. Signal 10 is phase-modulated with a pseudo-random-noise (PN) code. For simplicity, the same reference numeral will be used to designate the signal or the code on the signal.

Network 12 includes two channels 20, 30, a summer 41, and a low-pass filter (LPF) 51. Channel 20 is the reference channel and includes a mixer 21, a band-pass-filter (BPF) 22, an amplifier 23, a detector 24, and a LPF/amplifier 25, all being cascaded in the channel as shown. Channel 30 is the signal channel and is arranged similarly to channel 20. It also includes a mixer 31, a band-pass-filter 32, an amplifier 33, a detector 34, and a LPF/amplifier 35.

Line 10 is connected to one input of mixer 21 and to one input of mixer 31 through a power splitter 11. The other input of mixer 21 is connected to line 13 which receives a local demodulating signal carrying an incorrect code, that is, a code which is totally different from the expected PN code 10. The other input of mixer 31 is connected to line 15 which receives a local replica of the PN code 10.

In operation, the expected signal 10 is a radio-frequency signal, say 10 MHz, and carries a prescribed PN code by phase modulation. Signal 10 is equally divided into signals 10a and 10b by power splitter 11. Each mixer is essentially a multiplier.

Mixer 21 multiplies signal 10a with the incorrect code 13. The output of mixer 21 is, therefore, low. Since the reference channel 20 is being correlated with an incorrect code 13, there is no increase in the output of mixer 21 even when codes 10a and 13 are aligned in phase, which they never are, since signal 13 may in practice even be selected to be equal in amplitude to the replica code. Mixer 31 multiplies the incoming PN code 10b with its replica 15 which is produced by a local PN code generator (not shown). The phase of PN code 15 can be shifted within the generator so as to align codes 10b and 15 in phase. When that happens the output of mixer 31 is larger within the bandpass of the band-pass filter and the codes are said to be correlated.

Conversely, a signal which is not coded with the transmitted PN code, such as a jammer signal or noise signal, does not appreciably contribute to the output of mixer 31.

Each of BPF filters 22 or 32 will pass only signals falling within a certain bandwidth, on either side of its center frequency, say 10 MHz. When the local code 15 becomes aligned with the incoming code 10b, the bandwidth of the signal passing through BPF 32 narrows and more energy is allowed to pass therethrough. The output from the band-pass filter 32 represents both noise and the detected PN code 10. Since the incoming code 10a cannot become aligned with local code 13, the output from the band-pass-filter 22 will represent only noise propagated through the reference channel 20.

In the reference channel 20 the output from the band-pass-filter 22 after being amplified by amplifier 23 is detected by detector 24. The detected noise is amplified by amplifier 25 and applied to one input of the summer 41.

In the signal channel 30, the output from the band-pass-filter 32 is amplified by amplifier 33, detected by detector 34, amplified by amplifier 35, and applied to the other input of the summer 41 which will subtract the outputs of channels 20 and 30 and provide a difference signal.

Each detector 24 or 34 is an amplitude detector. The output level of detector 24 corresponds to the noise level being propagated through the reference channel 20. The output of detector 34 will include the same noise. Therefore, the polarity of the summer's output difference signal indicates the presence or absence of correlation with the incoming code 10b and its absolute magnitude indicates the degree of correlation. More specifically, when phase correlation is achieved between codes 10b and 15, this difference signal from summer 41 will be relatively large and negative, and when such correlation is not achieved, this difference signal will be very small and positive. This is so because when there is no correlation in channel 30 between signals 10b and 15, the two outputs from detectors 24 and 34 represent substantially the same noise which will cancel out during the subtraction in the summer 41.

In the ideal case, the summer would give zero output for no correlation and a non-zero voltage for correlation. In practice, a dc offset is introduced in the summer which gives positive or negative output because detection of signals which are above or below ground is usually more reliable and simpler than those above or below an arbitrary reference.

The low-pass-filter 51 following the summer is for the purpose of filtering out noise peaks. The signals 10b and 15 when correlated produce more energy than noise and, therefore, only the higher energy signals are allowed to pass through LPF 51. Without filter 51 false outputs could occur which might be taken to represent a false correlation.

In sum, by using a reference channel 20 in parallel with an identical, matched signal channel 30, and subtracting the detected outputs produced by both channels, noise cancellation results from the output of summer 41.

A serious disadvantage of the conventional two-channel threshold detector 12 is that the duplication of channels and especially of band-pass-filters 22, 32, of detectors 24, 34, of mixers 21, 31, etc., is expensive from cost, space, and power consumption points of view. In addition, the amplifiers' gain and phase shift characteristics, as well as those of the filters, mixers and detectors, have to be compensated for temperature changes with special temperature compensation networks (not shown) whose characteristics also change with aging.

B. Description of the Invention

Figure 2:
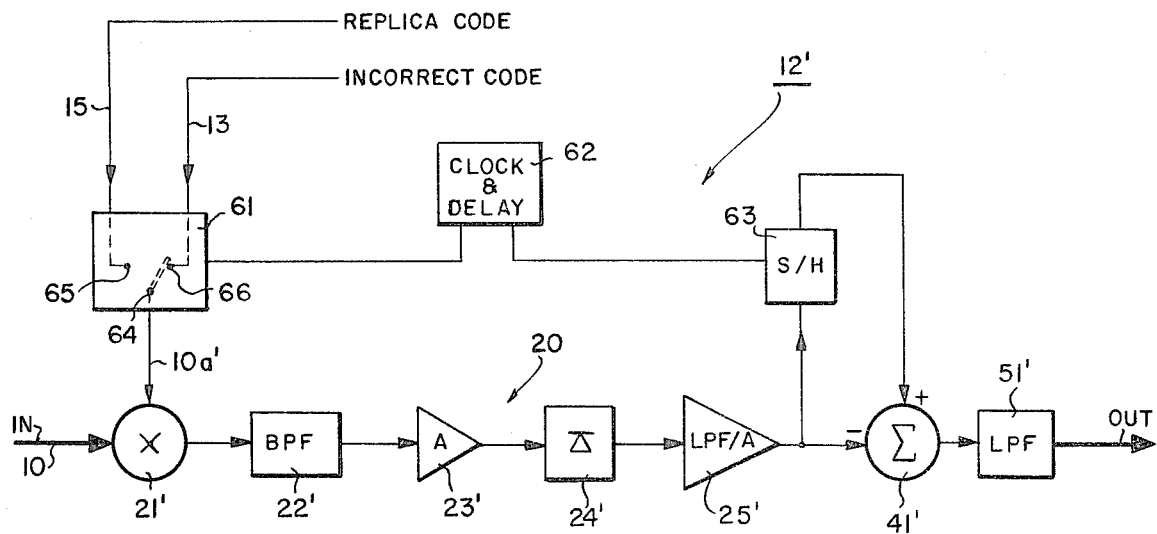
FIG. 2 is a block diagram of the time-shared, single-channel threshold detector in accordance with the invention.

The self-calibrating threshold detector 12' of the present invention uses only a single channel 20' (FIG. 2). It includes the same networks as those of channel 20 previously described. These networks are denoted in FIG. 2 with the same reference characters as in FIG. 1 followed by a prime (') to indicate identity or similarity.

The networks which have been eliminated from the detector 12 of FIG. 1 include: the power splitter 11, mixer 31, band-pass-filter 32, amplifier 33, detector 34, LPF/amplifier 35, and most of associated networks (not shown) used for temperature compensation.

Instead of the eliminated networks, there have been added relatively inexpensive and small digitial networks such as; a gate 61, a clock or timing and delay network 62, and a sample-and-hold (S/H) network 63.

The gate circuit 61 is preferably an electronic switch. Typically, it is a transistorized FET switch, acting as a single-pole, double-throw switch for selectively closing either its contacts 64, 65 or its contacts 64, 66 in correspondence with the clock pulse received from the timing network 62. Thus, gate 61 will apply to the correlator or mixer 21' either the replica PN code from line 15 or the incorrect code from line 13. During the time interval when the incorrect code 13 is being applied by gate 61 to mixer 21', the single channel 20' of the detector 12' serves the function of the reference channel 20 of the prior art two-channel detector 12 (FIG. 1). During the time interval that the replica code 15 is being applied by gate 61 to the mixer 21', the single-channel 20' serves the function of the signal channel 30 of the two-channel detector 12. Thus, the single-channel 20' of the new detector 12' serves a double function by being time-shared. It no longer requires reference channel 30 for calibration and, therefore, is self-calibrating. When the mixer 21' is supplied with the incorrect code 13, the output of LPF amplifier 25' is sampled and held by the sample-and-hold circuit 63. When the mixer 21' demodulates with the replica code 15, the output of amplifier 25' is directly applied to the negative input of summer 41' simultaneously with the output of the S/H circuit 63. Thus, the output level of the summer 41' will be substantially the same as the output of the summer 41 in the two-channel detector 12. The clock and delay network 62 synchronize and correlate the timing operations of the detector 12' in general and of the S/H circuit 63 in particular.

Because a single-channel 20' is now employed, signal acquisition detection is achieved, in accordance with the invention, without undue concern resulting from mismatched channels produced by component aging and electrical parameter variations caused by temperature changes.

The single-channel detector 12' uses less circuits as compared to detector 12, and the additional auxiliary digital circuits required for channel 20' are relatively inexpensive. For example, these auxiliary circuits cost on the order of a few dollars as compared to $50.00 for a power splitter, $50.00 for a mixer, $400.00 for a reliable band-pass crystal filter, $50.00 for an RF amplifier, $10.00 for an amplitude detector, and hundreds of dollars in labor cost for the temperature-compensating circuits. Thus, the savings in parts alone resulting from this invention are more than a thousand dollars per detector.

Since the single-channel detector 12' is self-calibrating, it requires fewer initial adjustments for balance and much less thermal compensation is required. In addition, unpredictable changes with age in gain, bandwidth, dc offset, etc., do not affect the single-channel detector 12' as significantly as the two-channel detector 12 because the circuits are shared in detector 12' rather than duplicated as in detector 12. The time sharing of the single-channel 20' cancels out drifts in the channel's gains, and other long-term aging effects.

In sum, by using time sharing, signal acquisition detection in a low signal-to-noise environment can be achieved without undue concern for component aging, ambient temperature, etc. The incoming code 10 is fed directly into the single time-shared channel 20'. During a short time interval, the single-channel 20' is arranged by the timing network 62 so that incorrect demodulation of code 10 surely results. The output level from amplifier 25' is then sampled, filtered, and stored within the sample-and-hold circuit 63. The single-channel 20' is then rearranged by the timer network 62 to produce correct demodulation of code 10 during a relatively long time interval. After subtraction by summer 41' of the stored level from the level produced by amplifier 25' in channel 20' during the long time interval, an indication of signal presence or acquisition is produced just as with the known detector 12.

As in the two-channel detector 12, a zero or low-output level from summer 41' indicates no correlation, while a level greater in magnitude indicates correlation with the incoming signal. A dc offset could be injected so that, for example, a negative output will indicate no signal presence, while a positive output will indicate such signal presence.

The timing circuit 62 controls the operations of both the gate 61 and the sample-and-hold circuit 63. Since some circuits in the single-channel 20' introduce a time lag at the operating frequency, it is desirable also to delay, wherever needed, the timing pulses from clock 62 in correspondence with such time lag, as will be apparent to those skilled in the art.

Figure 3:
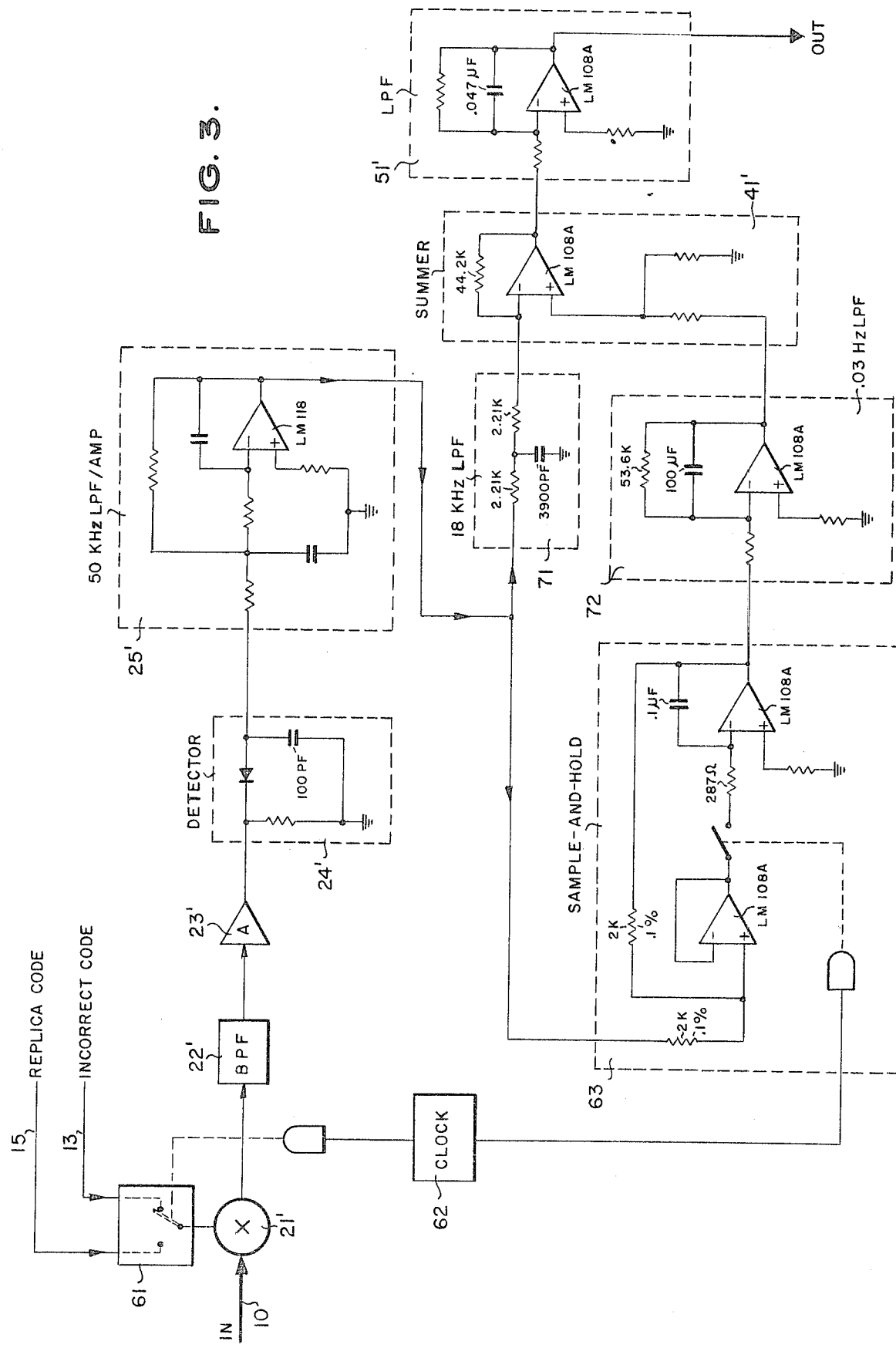
FIG. 3 is a schematic circuit diagram of the single-channel detector shown in FIG. 2.

To further describe the invention and to illustrate a practical embodiment thereof, there is shown in FIG. 3 a simplified schematic circuit diagram of some of the blocks shown in FIG. 2. As will be noted from FIG. 3, in addition to the networks identified in the blocks shown in FIG. 2, the circuit diagram also includes a pair of low-pass-filters 71 and 72. Clock 62 produces a short calibration pulse $T_n$ followed by a long dwell pulse $T_c$. The composite signal applied by gate 61 to mixer 21' consists of the incorrect code 13 during the short time interval $T_n$, and of the replica code 10 during the relatively long time interval $T_c$. After square-law detection by the detector 24', the detected signal is passed through a 50 KHz low-pass-filter/amplifier 25' having a gain of about 28 db. The cut off frequency of the 50 KHz/LPF amplifier 25' must be such that, first its bandwidth must be high enough so that the pulse $V_n$ resulting from the incorrect code 13 demodulation (noise) is passed with reasonable fidelity to the sample-and-hold circuit 63 and, second that the bandwidth must be low enough to set the time delay and to reduce noise variance. After the sampling, the noise variance can be reduced still further since pulse fidelity is no longer required. For example, an 18 KHz RC-low-pass-filter 71 can be inserted between amplifier 25' and the summer 41'.

The output of amplifier 25' will be an ac signal whose amplitude is relatively low during $T_n$ or when uncorrelated, and is relatively high during $T_c$ when correlated. The amplitude voltage of this ac signal will vary from $V_n$ (noise calibration level obtained during $T_n$) to $V_c$ (correct output level obtained during $T_c$ when the mixer 21' correctly demodulates code 10). During $T_c$ when no correlation is present between the phases of codes 10 and 15, $V_c$ will be equal to $V_n$.

The sample-and-hold circuit 63 uses a delayed pulse to sample $V_n$. The sample-and-hold circuit output is $-V_n$ since its gain is set to be $-1$ by the feedback resistors. After sampling, the 0.03 Hz low-pass-filter/amplifier 72 reduces the variance of the sampled signal to a very small level, re-inverts the voltage, and amplifies it by a factor of $A_1$. This noise calibration level, $A_1V_n$, is then applied to the positive input of the summer 41'. The filtered output of amplifier 25' is applied to the negative input of summer 41'.

When the filtered output from the sample-and-hold circuit 63 and the filtered output from the amplifier 25' are subtracted in the summer 41', the resulting output is $V_s = A_2(A_1V_n - V_c)$, where $V_s$ is the summer's output and $A_2$ is its gain. If $V_c = V_n$ (no correlation between codes 10 and 15) the summer output is positive; on the other hand, if $V_c$ is greater than $A_1V_n$, that is, when a correlation exists, the output of the summer is negative. The polarity of the summer output, therefore, indicates presence or absence of correlation in mixer 21', and the magnitude of the summer output indicates the degree of such correlation, which is the result previously described as being obtained by the two-channel detector 12.

What is claimed is:

1. In a system for receiving an incoming signal modulated by a prescribed code, the combination comprising:
   a. a correlator receiving said incoming code and successively cross-correlating same with a local replica of said incoming code and with an incorrect code, said correlator producing during one time interval a reference signal corresponding to the correlation with said incorrect code, and further producing during a successive time interval an output signal corresponding to the correlation with said replica code;
   b. hold means holding a sample of said reference signal; and
   c. comparator means comparing said sample reference signal with said output signal to provide a resultant difference signal indicative of said correlation with said replica code.

2. The system according to claim 1 wherein said hold means is a sample-and-hold circuit.

3. The system according to claim 2 and further including:
   switching means for switching said replica code and said incorrect code to said correlator; and
   clock means for synchronizing the operation of said switching means and said sample-and-hold circuit.

4. The system according to claim 3 wherein said comparator means is a summer circuit and said clock means synchronize the application of said sample reference signal and said output signal to the two inputs of said summer.

5. The system according to claim 4 and further including:
   signal processing means comprising:
     a band-pass-filter coupled to the output of said correlator for extracting the correlated signals from adjoining signals;
     an amplitude detector for demodulating the correlated signals passed through said band-pass-filter; and
     amplifier means applying the output of said detector to one input of said summer.

6. The detector of claim 1 wherein said one time interval is relatively short compared to said successive time interval.

* * * * *